(12) United States Patent
Kioua et al.

(10) Patent No.: US 12,110,120 B2
(45) Date of Patent: Oct. 8, 2024

(54) PROPULSION UNIT FOR AN AIRCRAFT AND METHOD FOR MOUNTING SAME

(71) Applicant: SAFRAN NACELLES, Gonfreville-L'Orcher (FR)

(72) Inventors: Hazem Kioua, Moissy-Cramayel (FR); Thomas Marlay, Moissy-Cramayel (FR); Charles-Antoine Lampaert, Moissy-Cramayel (FR); Pierre-Alain Reboul, Moissy-Cramayel (FR)

(73) Assignee: SAFRAN NACELLES, Gonfreville-L'Orcher (FR)

( * ) Notice: Subject to any disclaimer, the term of this patent is extended or adjusted under 35 U.S.C. 154(b) by 0 days.

(21) Appl. No.: 18/255,025

(22) PCT Filed: Dec. 1, 2021

(86) PCT No.: PCT/FR2021/052164
§ 371 (c)(1),
(2) Date: May 30, 2023

(87) PCT Pub. No.: WO2022/123146
PCT Pub. Date: Jun. 16, 2022

(65) Prior Publication Data
US 2024/0026798 A1    Jan. 25, 2024

(30) Foreign Application Priority Data
Dec. 7, 2020 (FR) ..................................... 2012769

(51) Int. Cl.
*B64D 27/40*    (2024.01)
*B64D 29/06*    (2006.01)
(Continued)

(52) U.S. Cl.
CPC ............. *B64D 27/40* (2024.01); *B64D 29/06* (2013.01); *B64D 29/08* (2013.01); *F01D 25/243* (2013.01);
(Continued)

(58) Field of Classification Search
CPC ........ B64D 27/40; B64D 29/06; B64D 29/08; F01D 25/243; F01D 25/28; F02C 7/00; F02C 7/04; F02C 7/20
See application file for complete search history.

(56) References Cited

U.S. PATENT DOCUMENTS 3,591,963 A    7/1971 Kopp
3,879,941 A  * 4/1975 Sargisson ................ F02K 3/075
                                                          60/226.3
(Continued)

OTHER PUBLICATIONS

International Search Report mailed Apr. 4, 2022, issued in corresponding International Application No. PCT/FR2021/052164, filed Dec. 1, 2021, 5 pages.
(Continued)

*Primary Examiner* — Sabbir Hasan
*Assistant Examiner* — Andrew J Marien
(74) *Attorney, Agent, or Firm* — CHRISTENSEN O'CONNOR JOHNSON KINDNESS PLLC (57) ABSTRACT

A propulsion unit for an aircraft includes a gas generator; an air inlet; and a sealing system inserted axially between the air inlet and the gas generator. The sealing system has at least: a compression ring with a first axial end configured for mechanical connection to one of the gas generator and the air inlet. The compression ring also has a second opposite axial end configured to be axially separated from the other of the gas generator and the air inlet by an annular space. An annular seal is mounted in the space and configured to be axially compressed by reduction of the axial dimension of said space.

13 Claims, 10 Drawing Sheets

(51) Int. Cl.
*B64D 29/08* (2006.01)
*F01D 25/24* (2006.01)
*F01D 25/28* (2006.01)
*F02C 7/00* (2006.01)
*F02C 7/04* (2006.01)
*F02C 7/20* (2006.01)

(52) U.S. Cl.
CPC ............... *F01D 25/28* (2013.01); *F02C 7/00* (2013.01); *F02C 7/04* (2013.01); *F02C 7/20* (2013.01); *F05D 2220/323* (2013.01)

(56) References Cited

U.S. PATENT DOCUMENTS

| | | | | |
|---|---|---|---|---|
| 4,361,296 A | * | 11/1982 | Hall | B64D 29/00 60/797 |
| 5,609,313 A | * | 3/1997 | Cole | B64D 29/00 244/54 |
| 6,892,526 B2 | * | 5/2005 | Stretton | F02K 1/805 244/53 B |
| 2005/0081531 A1 | * | 4/2005 | Stretton | B64D 27/16 60/797 |
| 2007/0222163 A1 | | 9/2007 | Allford | |
| 2016/0146030 A1 | | 5/2016 | Bifulco | |
| 2020/0378308 A1 | | 12/2020 | Slaney | |
| 2022/0356839 A1 | * | 11/2022 | LaBelle | F02C 7/045 |
| 2023/0103861 A1 | * | 4/2023 | Bifulco | F02C 7/045 181/213 |

OTHER PUBLICATIONS

Written Opinion mailed Apr. 4, 2022, issued in corresponding International Application No. PCT/FR2021/052164, filed Dec. 1, 2021, 6 pages.

* cited by examiner

PROPULSION UNIT FOR AN AIRCRAFT AND METHOD FOR MOUNTING SAME

FIELD OF THE DISCLOSURE

The present disclosure relates to a propulsion unit for an aircraft, as well as to a method for mounting this propulsion unit.

BACKGROUND

The technical background comprises in particular the documents US-A1-2016/146030, US-A1-2007/222163, US-A1-2020/378308 and U.S. Pat. No. 3,591,963.

A propulsion unit for an aircraft typically comprises a gas generator and an air inlet.

A gas generator comprises, from upstream to downstream, with reference to the flowing of the gases, at least one compressor, an annular combustion chamber and at least one turbine. The gas generator is, for example, a turbomachine or a turbojet engine.

The air inlet is located upstream of the gas generator and channels the air flow entering into the gas generator. In the case of a turbomachine or a turbojet engine with a fan, the air inlet is formed by a nacelle surrounding the fan located upstream of the gas generator.

Figure 1:
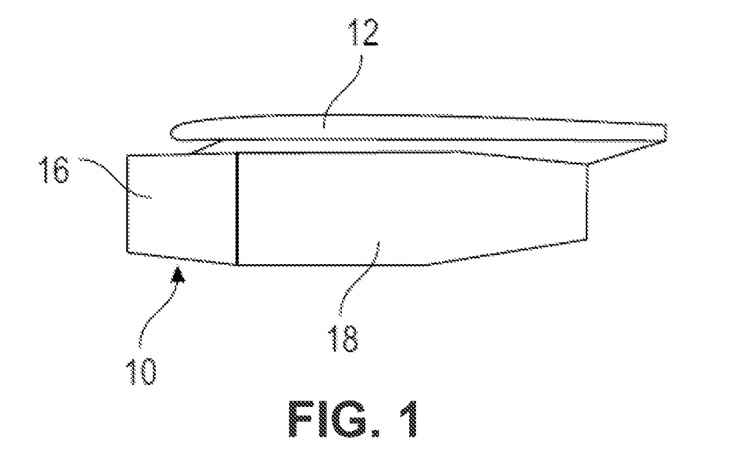
FIG. 1 is a very schematic view of a propulsion unit attached in a lateral position to a wing of an aircraft.
Figure 2:
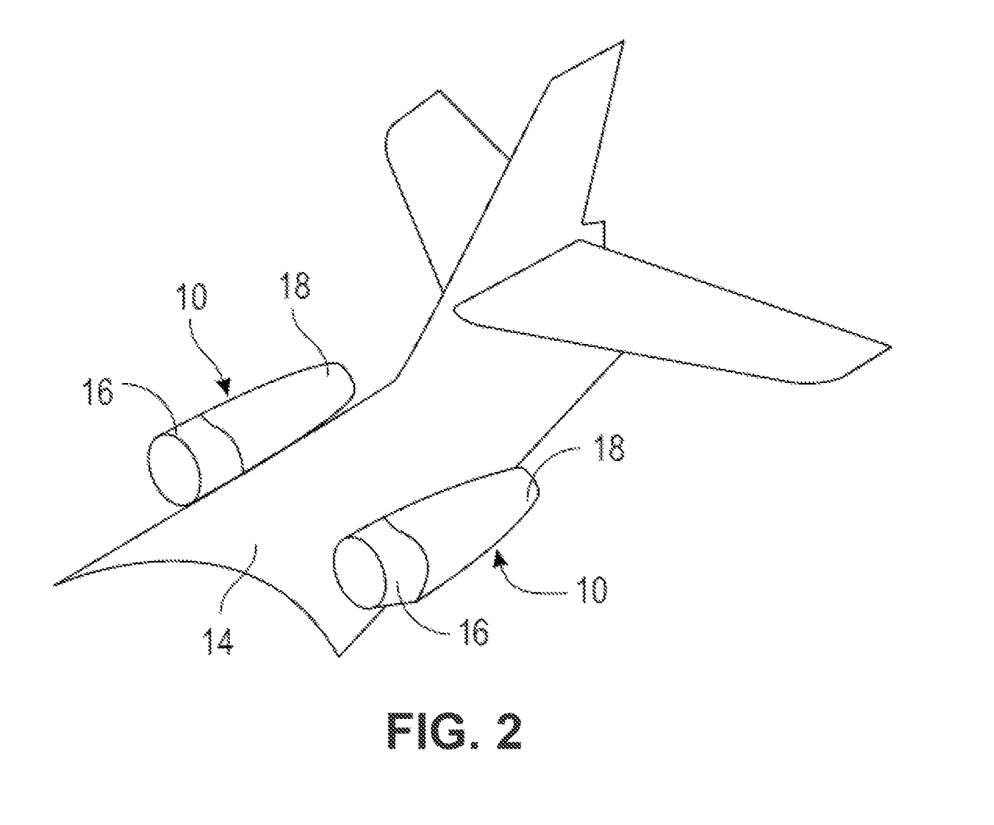
FIG. 2 is a very schematic view of two propulsion units attached in a lateral position at the rear of a fuselage of an aircraft.
Figure 3:
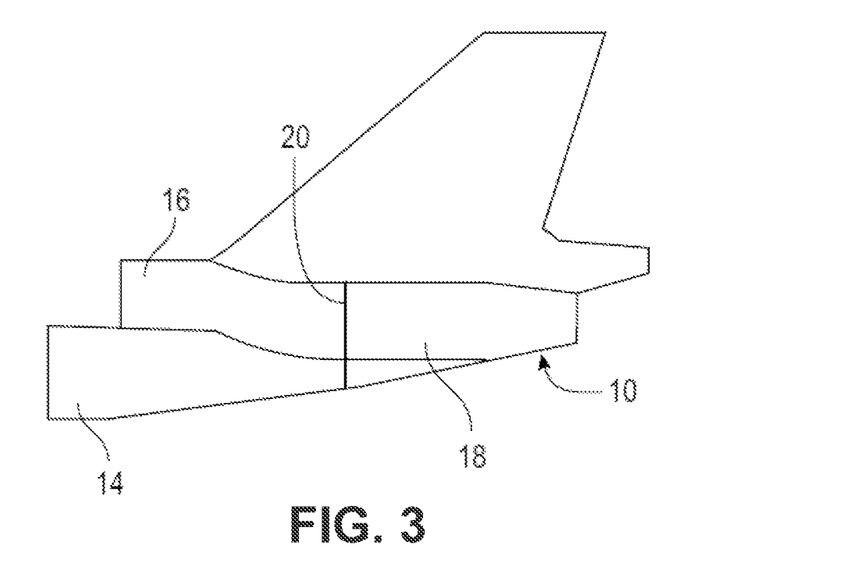
FIG. 3 is a very schematic view of a propulsion unit attached in central position at the rear of a fuselage of an aircraft.

As can be seen in FIGS. 1 to 3, a propulsion unit can be installed in a lateral position or central position on an aircraft. FIGS. 1 and 2 illustrate lateral positions of a propulsion unit 10 located under a wing 12 and at the rear of the fuselage 14 of the aircraft respectively. FIG. 3 illustrates a central position of a propulsion unit 10 located at the rear in the fuselage 14 of the aircraft.

In the lateral position, the propulsion unit 10 generally forms a monobloc unit suspended from the wing 12 or the fuselage 14. The air inlet 16 is therefore generally attached to the gas generator 18 via a bolted assembling.

In the central position, the air inlet 16 and the gas generator 18 are generally independent and independently attached to the aircraft structure. A sealing system 20 is then interposed axially between the air inlet 16 and the gas generator 18 to ensure a sealing between these elements while allowing relative displacements between them in operation, or even to provide a fire protection for the area.

The air inlet 16 and the gas generator 18 are independent in the latter case and are installed one after the other on the aircraft. One first of the elements, such as the air inlet 16, is attached to the aircraft and then the other element, the gas generator 18, is mounted in turn. This other element can be mounted in two ways.

In a first manner, the gas generator 18 is positioned coaxially with the air inlet 16 and is then displaced in axial translation towards the air inlet up to its final position in which the sealing system is axially constrained between the air inlet and the gas generator.

Figure 4:
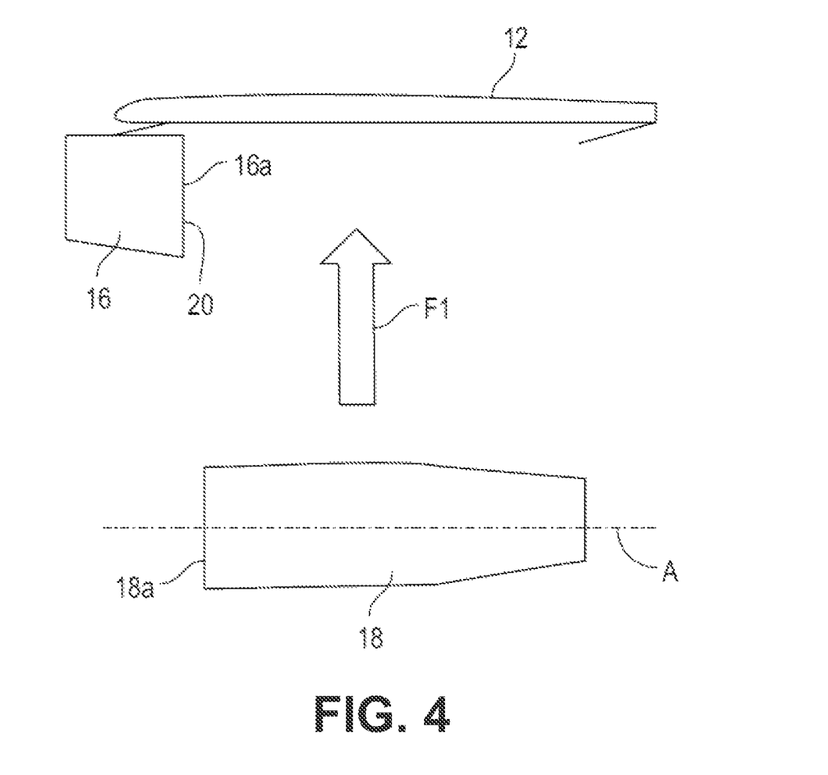
FIG. 4 is a similar view to FIG. 3 and illustrates a mounting operation of a gas generator of the propulsion unit.
Figure 5:
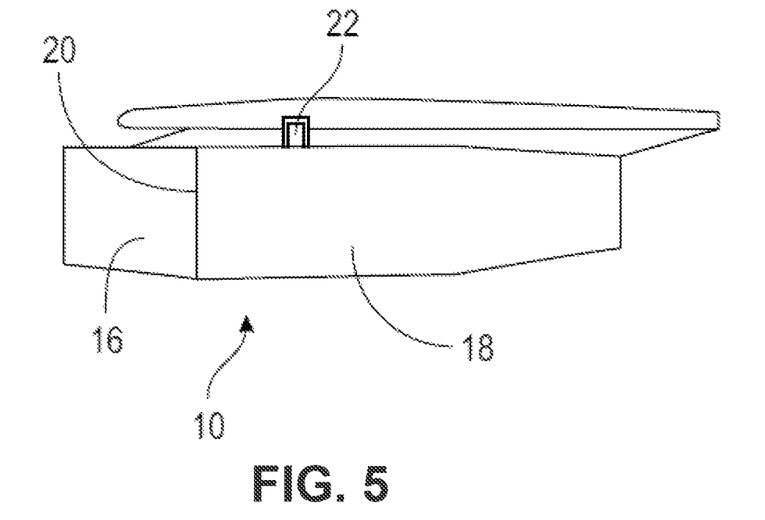
FIG. 5 is a similar view to that of FIG. 1 and illustrates a process for attaching a gas generator of the propulsion unit.

In a second manner illustrated in FIG. 4, the gas generator 18 is positioned parallel and laterally to the air inlet 16 such that the downstream edge 16a of the air inlet 16 and the upstream edge 18a of the gas generator 18 lie in a single plane perpendicular to the longitudinal axis A of the gas generator 18. The gas generator 18 is then displaced in a direction transverse with respect to this axis A (arrow F1) until the air inlet 16 and the gas generator 18 are axially aligned. The gas generator 18 is then attached to the structure of the aircraft. This attachment process is, for example, necessary where the means for attaching the gas generator 18 to the structure of the aircraft includes shear pins 22 shown schematically in FIGS. 5 and 6.

However, mounting an element in the second way is problematic in several respects. Firstly, during the transverse displacement, there is a risk of shearing of the system 20 between the edges 16a, 18a and therefore of damage to this system. Furthermore, even if an axial mounting clearance is originally provided to allow this displacement, it is not possible to suppress this clearance after the mounting with current technology, and the manufacturing tolerances and ribbing chains make it difficult to control this clearance in practice. A solution to this problem would be to not provide a sealing system between the air inlet and the gas generator, but this solution is not feasible at least for reasons of performance of the propulsion unit.

The present disclosure proposes a solution to at least some of the above problems.

SUMMARY

The disclosure relates to a propulsion unit for an aircraft, this propulsion unit comprising:
- a gas generator having a longitudinal axis and comprising at least one compressor, a combustion chamber and at least one turbine arranged one behind the other along the axis,
- a generally tubular air inlet arranged upstream of the gas generator with reference to the flowing of the gases in operation, and
- a generally annular sealing system interposed axially between the air inlet and the gas generator, the sealing system being configured to provide a sealing between a downstream edge of the air inlet and an upstream edge of the gas generator, these edges being configured to be disjoint from each other, characterised in that the sealing system comprises at least:
- a compression ring comprising a first axial end for mechanical connection to the aforementioned edge of a first of the elements chosen from among the gas generator and the air inlet, and a second opposite axial end intended to be axially separated from the aforementioned edge of a second of the elements by an annular space, this space having an axial dimension which can be reduced by bringing the compression ring closer to the second element, and
- an annular seal mounted in the space and configured to be axially compressed by reduction of the axial dimension of the space.

The sealing system thus comprises a compression ring which is configured to be secured by a mechanical connection to one of the elements, chosen from among the air inlet and the gas generator and to be disjoint from the other of these elements.

The compression ring is separated from this other element by a space for housing an annular seal which is axially compressible and provides the sealing between the elements, or even provides a fire protection in this area.

This assembly is particularly advantageous when mounting and dismounting the propulsion unit, as will be described in more detail below. In particular, the seal is compressible from an initial position up to an axially compressed position, the passage from the initial position to the compressed position being caused by the reduction of the axial dimension of the space for housing the seal and thus by the compression ring bringing closer to the element not mechanically connected to this ring. It is therefore understood that it is the axial displacement of the compression ring that allows the seal to be compressed to a greater or lesser extent. In the aforementioned initial position, which corresponds to the mounting and operating position of the propulsion unit, the seal is preferably also axially constrained to ensure an optimum sealing between the elements. The displacement of the compression ring is carried out when the ring is dissociated from the element to which it is to be mechanically connected. After the compression ring has been released from this element, the compression ring is displaced, and the seal is compressed. The compression ring is then moved away from the element to which it was connected, allowing this element to be removed by translation in a transverse direction without risk of damage to the seal or to the sealing system. The mounting of the propulsion unit can be carried out in a similar way in reverse order to the above steps.

The disclosure thus facilitates the mounting and the dismounting of a propulsion unit by allowing the transverse displacement of one of the elements of the unit relative to the other of these elements, while ensuring the integrity of the sealing system intended to be interposed between these elements.

The propulsion unit according to the disclosure may comprise one or more of the following characteristics, taken alone or in combination with each other:
- the seal is configured to be compressed to a predetermined axial dimension, preferably at least 5 mm, and/or to a predetermined compression ratio, preferably at least 25%;
- the seal comprises:
    - at least one annular portion comprising an annular cavity, this cavity having in axial cross-section a shape intended to be modified upon the compression of the seal, and/or
    - at least one annular portion comprising a cylindrical bead configured to be engaged in the compression ring or one of the edges, and/or
    - at least one annular sealing lip;
- the seal comprises an annular body of elastomeric or composite material and an annular sheet-metal extending to the internal periphery of the body;
- the first end of the compression ring comprises an annular flange for attachment to a complementary annular flange of the corresponding edge;
- the second end of the compression ring comprises projecting clevises which are located opposite similar clevises of the corresponding edge, and which are configured to allow the application of a force to reduce the axial dimension of the space;
- the clevises comprise axially aligned orifices for the passage of screws, the screws being configured to be screwed so as to reduce the axial dimension of the space and to be removed in normal operation of the propulsion unit;
- the compression ring comprises at least:
    - an annular sound attenuating wall or covering, and/or
    - longitudinal stiffeners extending along the axis;
- the air inlet is arranged coaxially upstream of the gas generator.

The present disclosure also relates to a method for mounting a propulsion unit as described above, wherein the method comprises the steps of:
a) positioning the sealing system coaxially with the second element, with the second end of the ring facing the edge of that element and the seal being mounted in the space,
b) bringing the second end of the compression ring closer to the edge of the second element so as to reduce the axial dimension of the space for housing the seal and thereby exert an axial compression force of the seal,
c) displacing the first element in a direction transverse with respect to a longitudinal axis of the second element, until the first and second elements are axially aligned, and the first end of the ring is separated by a predetermined axial distance from the edge of the first element,
d) suppressing the axial compression force of the seal so that an elastic return of the seal causes the suppression of the aforementioned axial distance, and
e) attaching the first end of the compression ring to the edge of the first element.

Advantageously, the seal remains axially constrained in the space at the end of step d) and during step e).

Preferably, step b) is carried out using clamps resting axially on the clevises, or using screws passing through orifices in the clevises.

The present disclosure further relates to a method for dismounting a propulsion unit, wherein the method comprises the steps of:
f) disengaging the first end of the compression ring from the edge of the first element,
g) bringing the second end of the compression ring closer to the edge of the second element so as to reduce the axial dimension of the space for housing the seal and thereby exert an axial compression force of the seal,
h) displacing the first element in a direction transverse with respect to a longitudinal axis of the second element, until the first and second elements are misaligned,
i) suppressing the axial compression force of the seal.

DESCRIPTION OF THE DRAWINGS

Further characteristics and advantages of the disclosure will become apparent from the following detailed description, for the understanding of which reference is made to the attached drawings in which.

DETAILED DESCRIPTION

FIGS. 1 to 6 have been described above.

Figure 7:
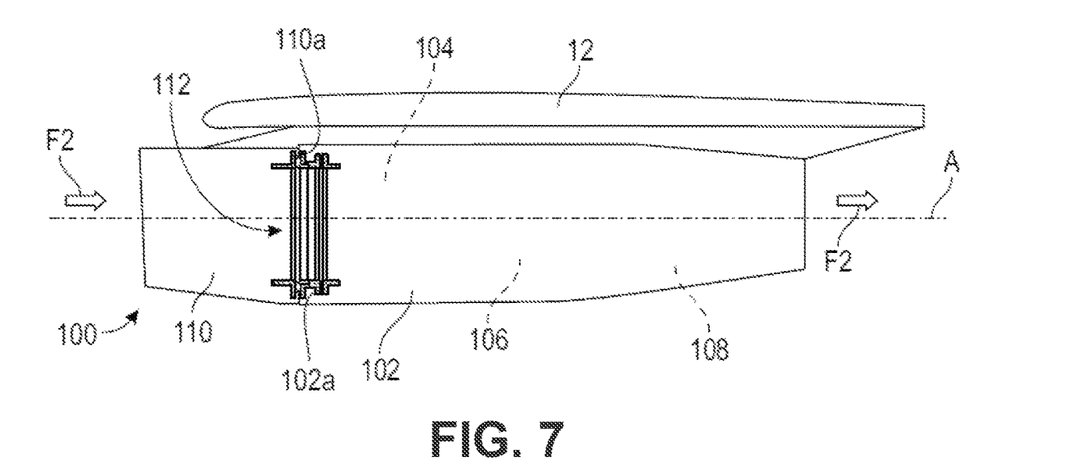
FIG. 7 is a similar view to that of FIG. 1 and illustrates an embodiment of a propulsion unit according to the disclosure.
Figure 8:
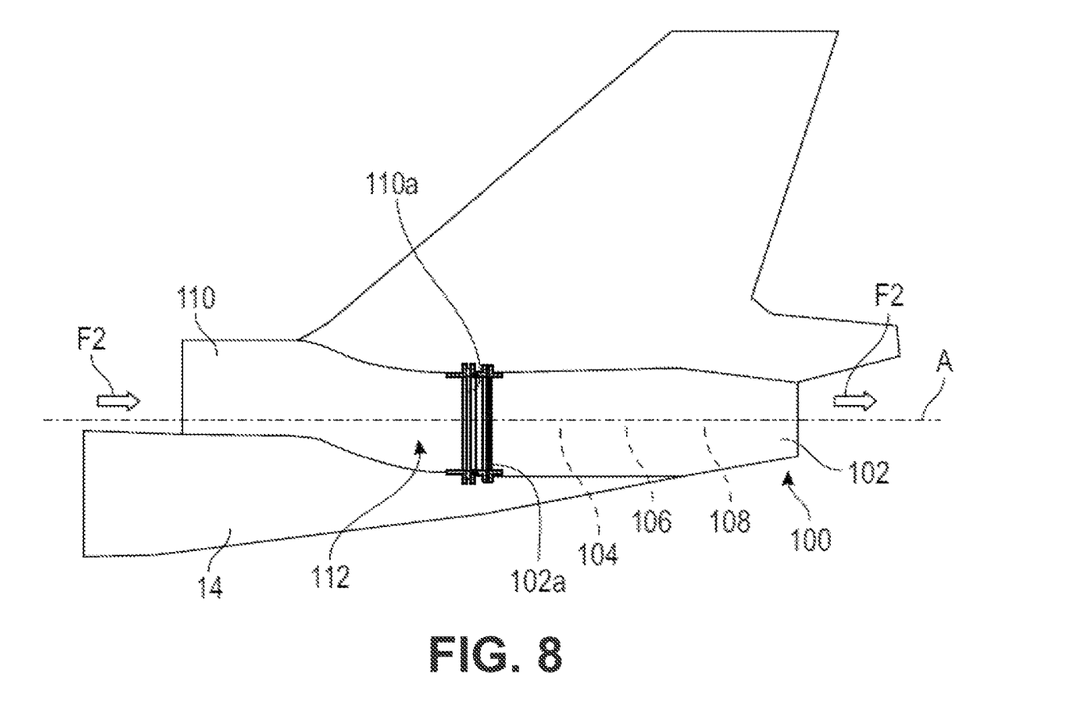
FIG. 8 is a similar view to that of FIG. 3 and illustrates an embodiment of a propulsion unit according to the disclosure.

FIGS. 7 and 8 show that the propulsion unit 100 according to the disclosure can be mounted in a lateral position, for example under a wing 12 of an aircraft (FIG. 7) or in a central position, for example at the rear of the fuselage 14 of the aircraft (FIG. 8).

The propulsion unit 100 comprises:
 a gas generator 102 having a longitudinal axis A and comprising at least one compressor 104, a combustion chamber 106 and at least one turbine 108 arranged one behind the other along the axis,
 a generally tubular air inlet 110 arranged, for example coaxially, upstream of the gas generator 102 with reference to the flowing of the gases in operation (arrows F2), and
 a sealing system 112 of generally annular shape interposed axially between the air inlet 110 and the gas generator 102, the sealing system 112 being configured to provide a sealing between a downstream edge 110a of the air inlet 110 and an upstream edge 102a of the gas generator 102, these edges being configured to be disjoint from each other and thus to remain dissociated during the operation of the propulsion unit 100.

The air inlet 110 may have a tubular or straight cylindrical shape, as shown in FIG. 7, or may have a more complex shape, for example with an S-shaped cross-section, as shown in FIG. 8. The air inlet 110 is attached by first attachment means not shown to the structure of the aircraft.

Figure 6:
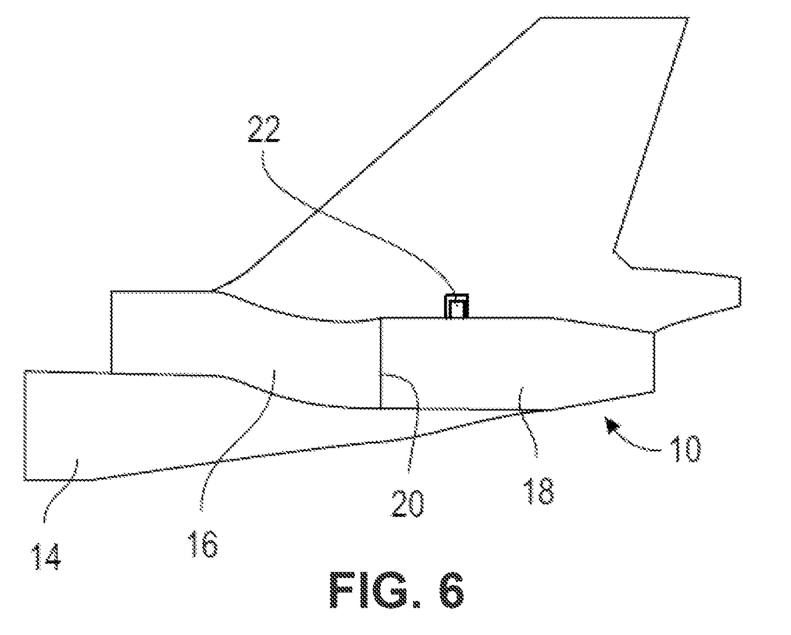
FIG. 6 is a similar view to that of FIG. 3 and illustrates a process for attaching a gas generator of the propulsion unit.

The gas generator 102 is attached by second attachment means not shown to the structure of the aircraft, the second attachment means being independent of the first attachment means. These attachment means may for example comprise shear pins 22 as shown in FIG. 6.

Figure 11:
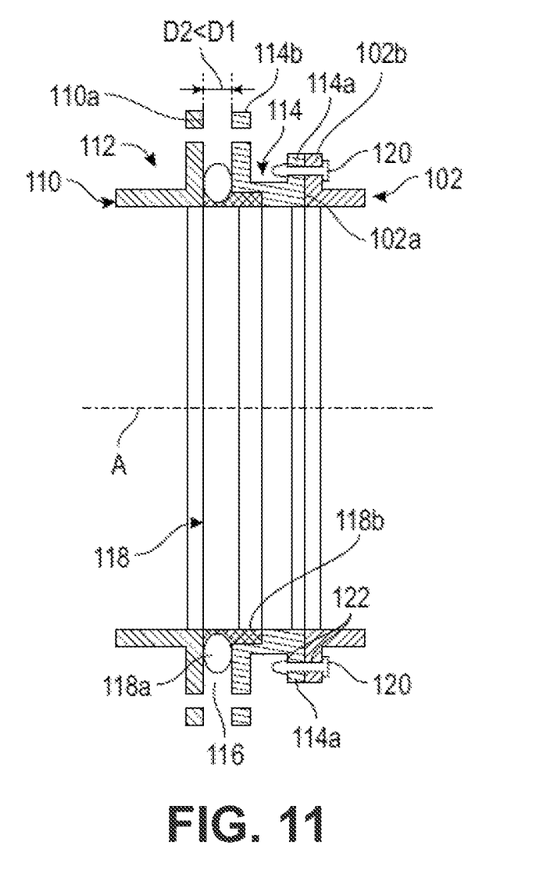
FIG. 11 is a larger scale view of a portion of FIG. 7 and shows a sealing system in the operating position.

The sealing system 112 is best seen in FIG. 11 and comprises essentially two portions:
 a compression ring 114 which comprises a first axial end 114a for mechanical connection to the aforementioned edge of a first of the elements selected from the gas generator 102 and the air inlet 110, and a second opposite axial end 114b intended to be axially separated from the aforementioned edge of a second of the elements by an annular space 116, this space having an axial dimension which can be reduced by bringing the compression ring closer to the second element, and an annular seal 118 mounted in the space 116 and configured to be axially compressed by reducing the axial dimension of this space.

Figure 10:
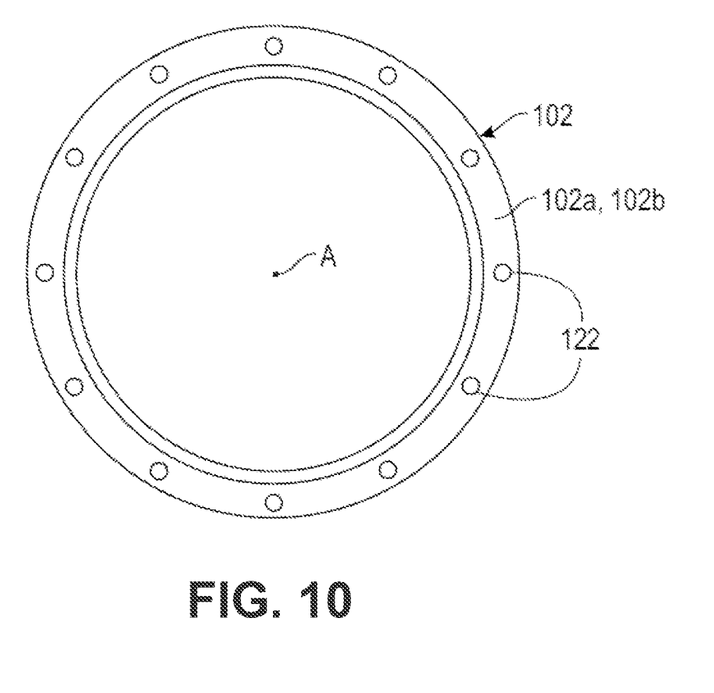
FIG. 10 is a schematic front view of an upstream edge of the gas generator of the propulsion unit of FIG. 7 or 8.

In the example shown in FIG. 11, which corresponds to the configuration of FIG. 7 or 8 in which the air inlet 110 is on the left-hand side of the drawing and the gas generator 102 is on the right-hand side, the compression ring 114 is attached by its first end 114a, which is therefore downstream, to the gas generator 102. To this end, the first end 114a of the compression ring 114 may comprise or be formed by an annular flange 114c which is intended to be secured by means of screws 120 or the like to a complementary annular flange 102b located on the edge 102 of the gas generator 102 (FIGS. 10 and 11). The flanges 102b, 114c are applied axially against each other and are attached by the screws 120 which pass through orifices 122 in these flanges 102b, 114c.

The opposite axial end 114b of the compression ring 114 is thus intended to be disjoint from the edge 110a of the air inlet 110, with the seal 118 being axially interposed in the space 116 between the end 114b and the edge 110a.

Between these ends 114a, 114b, the compression ring 114 comprises a cylindrical body and may further comprise:
 an annular sound attenuating wall or covering, and/or
 longitudinal stiffeners extending along the axis A.

Figure 12:
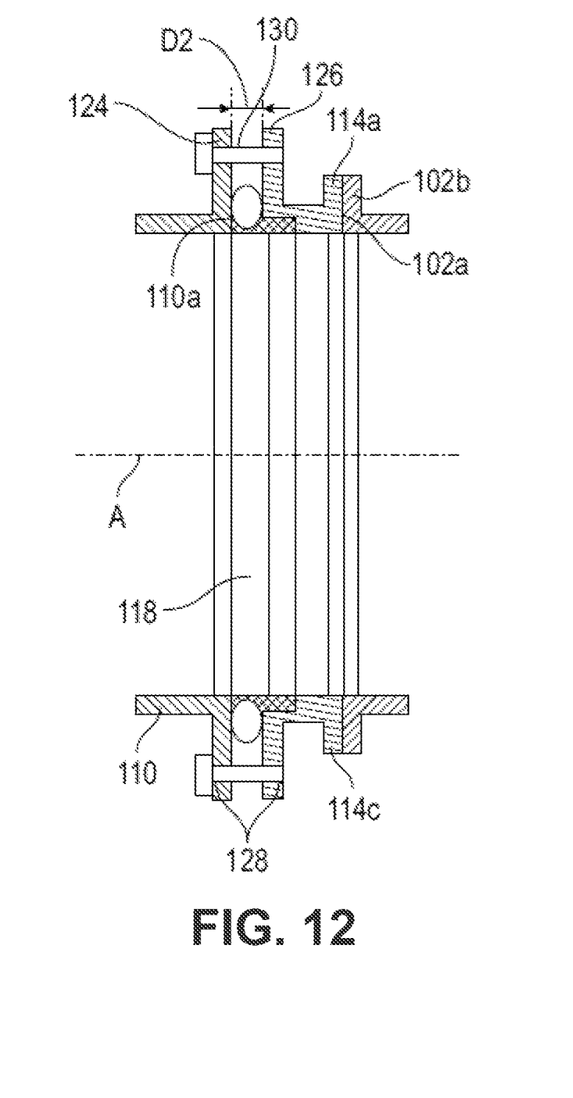
FIG. 12 is a similar view to that of FIG. 11 and illustrates a mounting/dismounting step of a method according to the disclosure.
Figure 13:
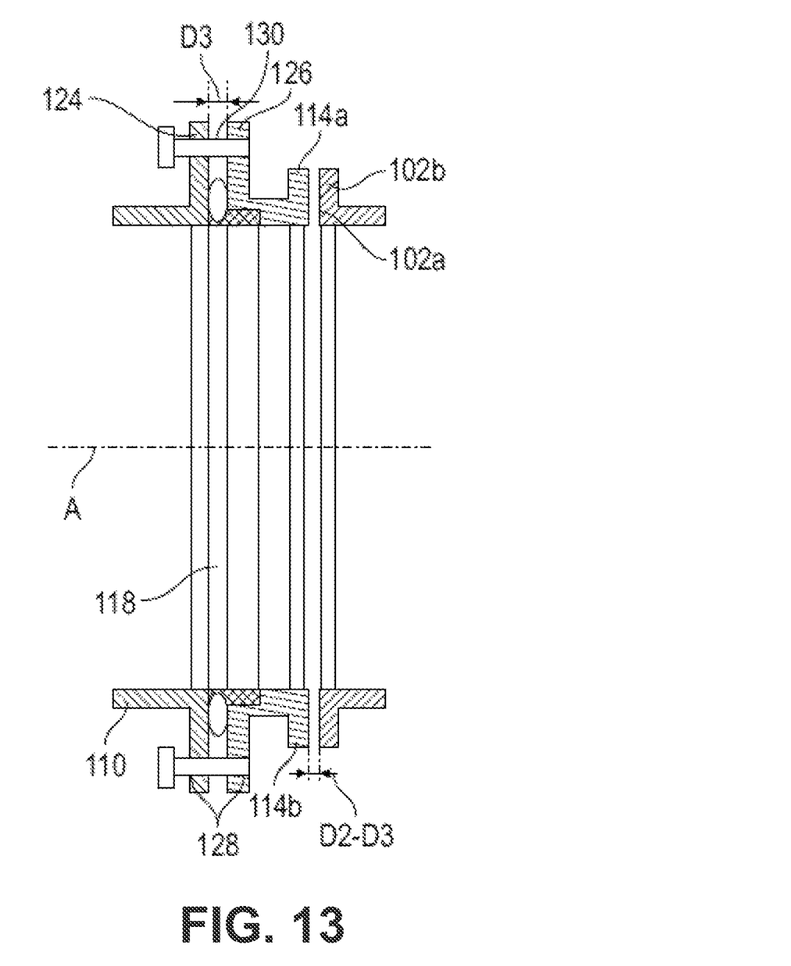
FIG. 13 is a similar view to that of FIG. 11 and illustrates a further mounting/dismounting step of a method according to the disclosure.
Figure 14:
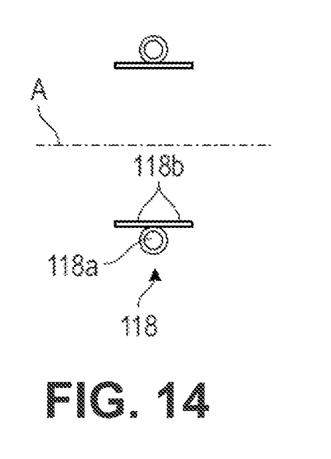
FIGS. 14 to 16 are schematic axial sectional views of alternative seal designs for a sealing system.

Advantageously, the end 114b and the edge 110a are equipped with means to apply a pulling force from the compression ring 114 towards the air inlet 110, and thus a force which tends to bring the compression ring closer to the air inlet, which will cause a reduction in the axial dimension of the space 116 and result in a compression of the seal 118 (passage from the state of FIG. 12 to the state of FIG. 13).

Figure 9:
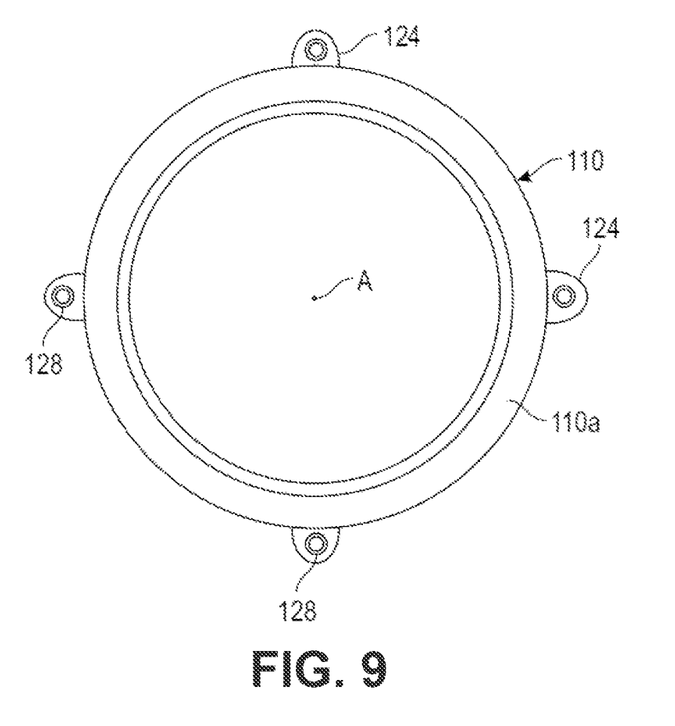
FIG. 9 is a schematic front view of a downstream edge of an air inlet of the propulsion unit of FIG. 7 or 8.

In the example shown in FIGS. 9 and 11, the edge 110a of the air inlet 110 is equipped with clevises 124 projecting radially outwards with respect to the axis A. These clevises 124 are located opposite similar clevises 126 of the end 114b of the compression ring 114. The clevises 124, 126 comprise orifices 128 for the passage of screws 130 or the like intended to be used to force the compression of the ring 114 as discussed above and as illustrated in FIGS. 12 and 13.

Alternatively, the clevises 124, 126 could be replaced by annular flanges similar to the flanges 102b, 114c. In yet another variant, the screws 130 could be replaced by clamps or any other means configured to bring the compression ring 114 closer to the air inlet 110.

Finally, in another variant and as mentioned above, the mounting of the compression ring 114 could be reversed and would thus be attached by its end 114a to the air inlet 110. Its end 114b would then be disjoint from the gas generator 102 and separated from it by the seal 118.

FIG. 11 shows the state of the sealing system 112 when the propulsion unit 100 is operating or is configured to operate. The compression ring 114 is rigidly connected to the gas generator 102 and the seal 118 provides the sealing between the air inlet 110 and the compression ring 114 and thus between the air inlet 110 and the gas generator 102.

In operation, the gas generator 102 and the air inlet 110 may be subject to relative displacements, which may cause elastic deformations of the seal 118 that ensures the sealing in this area.

The seal 118 may be made of an elastic material, such as an elastomer, or a composite material.

Figure 15:
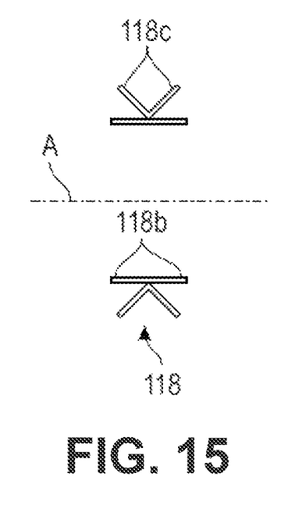
Figure 16:
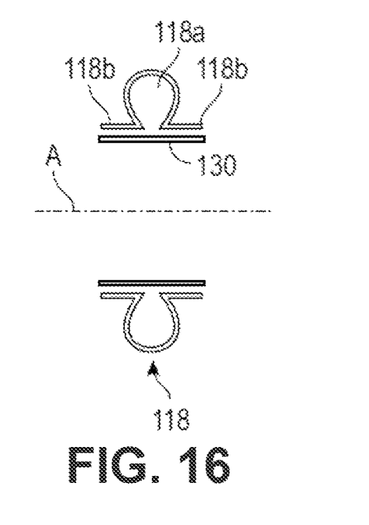

The seal 118 may comprise:
 at least one annular portion comprising an annular cavity 118a (FIGS. 11-13), this cavity being located in the space 116 and having in axial cross-section a shape intended to be modified upon compression of the seal, and/or
 at least one annular portion comprising a cylindrical bead 118b configured to be engaged in the compression ring 114 or one of the edges 102a, 110a (FIGS. 11-14) for example to facilitate the centring and the mounting of the seal, and/or at least one annular sealing lip 118c (FIG. 15) providing a sealing by abutment on an annular surface.

The seal 118 may have a general shape in axial cross-section of L, Ω, π, O, etc.

A sheet-metal 130 may be fitted and attached to the internal periphery of the seal 118 or the seal may comprise a sheet-metal 130 at its internal periphery. This sheet-metal 130 is intended to be swept by the airflow from the air inlet 110 to the gas generator and to protect the seal 118, for example, from fire or debris impacts.

FIGS. 12 and 13 illustrate states of the system 112 and the seal 118 during a mounting or dismounting method. Preferably, the seal 118 can adopt several states including:

an unstressed free state when not yet mounted in the space 116; the axial dimension of the portion of the seal 118 intended to be housed in the space 116 is denoted D1, an axially constrained state visible in FIG. 11, when mounted in the space 116 and the compression ring 114 is attached to the gas generator 102; the axial dimension of the portion of the seal 118 housed in the space 116 is then denoted D2, D2 being less than D1, an axially compressed state visible in FIG. 13, when the compression ring 114 is dissociated from the gas generator 102 and brought axially closer to the air inlet 110 in order to reduce the axial dimension of the space 116; the axial dimension of the portion of the seal 118 housed in the space 116 is then noted as D3, D3 being less than D2.

The seal 118 is for example configured to be compressed (passage from free or stressed state to compressed state) to an axial dimension of at least 5 mm and/or at a compression ratio of at least 25%. The compression ratio is the ratio between (D2-D3) and D2, or between (D1-D3) and D1 in the above case.

Figure 17:
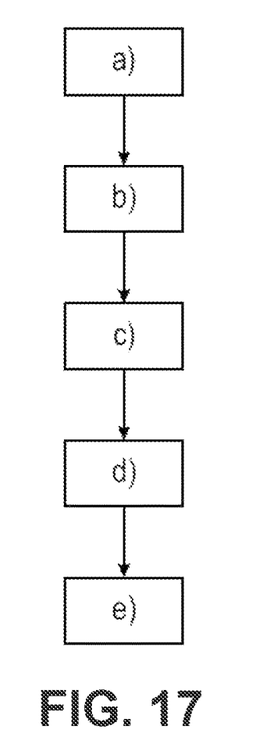
FIG. 17 is a flowchart comprising steps of a method according to the disclosure for mounting a propulsion unit.
Figure 18:
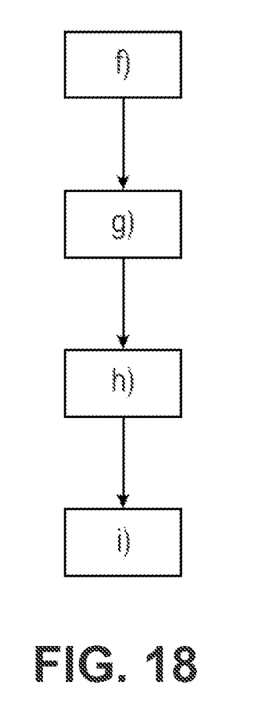
FIG. 18 is a flowchart comprising steps of a method according to the disclosure for dismounting a propulsion unit.

FIG. 17 illustrates steps for mounting the propulsion unit 110 and FIG. 18 illustrates steps for dismounting this propulsion unit.

The mounting method comprises the steps of:
a) positioning the sealing system 112 coaxially with the second element (the air inlet 110 in the example shown in the drawings), with the second end 114b of the ring 114 facing the edge of that element and the seal 118 being mounted in the space 116,
b) bringing the second end 114b of the compression ring 114 closer to the edge of this second element so as to reduce the axial dimension of the space 116 for housing the seal and thereby exert an axial compression force of the seal 118; the seal is thus moved from the free or constrained state to the compressed state,
c) displacing the first element (the gas generator 110 in the example illustrated in the drawings) in a direction transverse with respect to the axis A, until the first and second elements are axially aligned and the first end 114a of the ring 114 is separated by a predetermined axial distance from the edge of the first element (FIG. 13); this distance corresponds to the difference between the aforementioned dimensions D2 and D3,
d) suppressing the axial compression force of the seal 118 so that an elastic return of the seal causes the suppression of the aforementioned axial distance (FIG. 12), and
e) attaching the first end 114a of the compression ring 114 to the edge of the first element (gas generator 102-FIG. 11).

As mentioned above, the seal 118 preferably remains axially constrained in the space at the end of step d) and during step e).

Step b) can be carried out using clamps axially resting on the clevises 124, 126, or using screws 120 passing through the orifices 128 of the clevises, as discussed above (FIGS. 12 and 13).

The dismounting method comprises the steps of:
f) disengaging the first end 114a of the compression ring 114 from the edge of the first element (gas generator 102); the situation shown in FIG. 11 is thus changed to the situation shown in FIG. 12,
g) bringing the second end 114b of the compression ring 114 closer to the edge of the second element (air inlet 110) so as to reduce the axial dimension (reduction from D2 to D3) of the space 116 for housing the seal and thereby exert an axial compression force of the seal 118 (FIG. 13),
h) displacing the first element (gas generator 102) in a direction transverse with respect to the axis A, until the first and second elements are misaligned,
i) suppressing the axial compression force of the seal 118, which can then return to its free state without stress.

The disclosure provides several advantages including:
avoiding a complete removal of the air inlet each time the gas generator is removed,
reducing the risk and time of maintenance/replacement of the gas generator,
sharing the configurations of the propulsion unit between the three positions (lateral and central) on the aircraft,
optimising the positioning tolerances of the sealing system, and
ensuring an optimal sealing and an optimal aerodynamic at the level of this system.

The invention claimed is:

1. A propulsion unit for an aircraft, the propulsion unit comprising:
a gas generator having a longitudinal axis and comprising at least one compressor, a combustion chamber, and at least one turbine arranged one behind the other along said axis,
a tubular air inlet arranged upstream of the gas generator with reference to flowing gases in operation, and
an annular sealing system axially interposed between the air inlet and the gas generator, the sealing system being configured to provide a sealing between a downstream edge of the air inlet and an upstream edge of the gas generator, the edges being configured to be disjoint from each other,
wherein the sealing system comprises:
a compression ring comprising a first axial end to mechanically connect to a first element chose from the gas generator and the air inlet, and a second opposite axial end configured to be axially separated from a second element chosen from the gas generator and the air inlet by an annular space, said annular space having an axial dimension which is suitable to be reduced by bringing the compression ring closer to said second element, and
an annular seal mounted in the space and configured to be axially compressed by reduction of the axial dimension of the space,
wherein the second end of the compression ring comprises projecting clevises which are located opposite similar clevises of the corresponding edge and which are configured to allow the application of a force to reduce the axial dimension of said space.

2. The propulsion unit of claim 1, wherein the seal is configured to be compressed to an axial dimension of at least 5 mm and/or to a compression ratio of at least 25%.

3. The propulsion unit according to claim 1, wherein the seal comprises:
  at least one annular portion comprising an annular cavity having, in axial cross-section, a shape configured to be modified upon the compression of the seal, and/or
  at least one annular portion comprising a cylindrical bead configured to be engaged in the compression ring or one of the edges, and/or
  at least one annular sealing lip.

4. The propulsion unit according to claim 1, wherein the seal comprises an annular body of elastomeric or composite material and an annular sheet-metal extending to an internal periphery of the body.

5. The propulsion unit according to claim 1, wherein the first end of the compression ring comprises an annular flange configured to attach to a complementary annular flange of the corresponding edge.

6. The propulsion unit according to claim 1, wherein the devises comprise axially aligned orifices configured for a passage of screws, the screws being configured to be screwed so as to reduce the axial dimension of said space and to be removed during normal operation of the propulsion unit.

7. The propulsion unit according to claim 1, wherein said air inlet is arranged coaxially upstream of the gas generator.

8. A method for mounting the propulsion unit according to claim 1, the method comprising the steps of:
  a) positioning the sealing system coaxially with the second element, the second end of the ring facing the edge of said second element and the seal being mounted in said space,
  b) bringing the second end of the compression ring closer to the edge of the second element so as to reduce the axial dimension of the space for housing the seal and thereby exert an axial compression force of the seal,
  c) displacing the first element in a direction transverse with respect to a longitudinal axis of the second element, until the first and second elements are axially aligned and the first end of the ring is separated by a predetermined axial distance from the edge of the first element,
  d) suppressing the axial compression force of the seal so that an elastic return of the seal causes the suppression of the aforementioned axial distance, and
  e) attaching the first end of the compression ring to the edge of the first element.

9. The method according to claim 8, wherein the seal remains axially constrained in said space at the end of step d) and during step e).

10. The method according to claim 8, wherein the second end of the compression ring comprises projecting clevises which are located opposite similar clevises of the corresponding edge and which are configured to allow the application of a force to reduce the axial dimension of said space, and step b) is carried out using clamps resting axially on said clevises, or using screws passing through orifices in said clevises.

11. A method for dismounting the propulsion unit according to claim 1, comprising the steps of:
  f) disengaging the first end of the compression ring from the edge of the first element,
  g) bringing the second end of the compression ring closer to the edge of the second element so as to reduce the axial dimension of the space for housing the seal and thereby exert an axial compression force of the seal,
  h) displacing the first element in a direction transverse with respect to a longitudinal axis of the second element, until the first and second elements are misaligned, and
  i) suppressing the axial compression force of the seal.

12. A propulsion unit for an aircraft, the propulsion unit comprising:
  a gas generator having a longitudinal axis and comprising at least one compressor, a combustion chamber, and at least one turbine arranged one behind the other along said axis,
  a tubular air inlet arranged upstream of the gas generator with reference to flowing gases in operation, and
  an annular sealing system axially interposed between the air inlet and the gas generator, the sealing system being configured to provide a sealing between a downstream edge of the air inlet and an upstream edge of the gas generator, the edges being configured to be disjoint from each other,
  wherein the sealing system comprises:
  a compression ring comprising a first axial end to mechanically connect to a first element chosen from the gas generator and the air inlet, and a second opposite axial end configured to be axially separated from a second element chosen from the gas generator and the air inlet by an annular space, said annular space having an axial dimension which is suitable to be reduced by bringing the compression ring closer to said second element, and
  an annular seal mounted in the space and configured to be axially compressed by reduction of the axial dimension of the space,
  wherein the seal comprises:
  at least one annular portion comprising an annular cavity having, in axial cross-section, a shape configured to be modified upon the compression of the seal, and/or
  at least one annular portion comprising a cylindrical bead configured to be engaged in the compression ring or one of the edges, and/or
  at least one annular sealing lip.

13. A propulsion unit for an aircraft, the propulsion unit comprising:
  a gas generator having a longitudinal axis and comprising at least one compressor, a combustion chamber, and at least one turbine arranged one behind the other along said axis,
  a tubular air inlet arranged upstream of the gas generator with reference to flowing gases in operation, and
  an annular sealing system axially interposed between the air inlet and the gas generator, the sealing system being configured to provide a sealing between a downstream edge of the air inlet and an upstream edge of the gas generator, the edges being configured to be disjoint from each other,
  wherein the sealing system comprises:
  a compression ring comprising a first axial end to mechanically connect to a first element chosen from the gas generator and the air inlet, and a second opposite axial end configured to be axially separated from a second element chosen from the gas generator and the air inlet by an annular space, said annular space having an axial dimension which is suitable to be reduced by bringing the compression ring closer to said second element, and
  an annular seal mounted in the space and configured to be axially compressed by reduction of the axial dimension of the space, wherein the seal comprises an annular body of elastomeric or composite material and an annular sheet-metal extending to an internal periphery of the body.

* * * * *